Sept. 4, 1962 T. I. HILTON 3,052,281
STAY FUSING TIMING DEVICE
Filed May 4, 1959 4 Sheets-Sheet 1

INVENTOR
THOMAS I. HILTON
BY H. Edward Foerch, Jr.
ATTORNEY

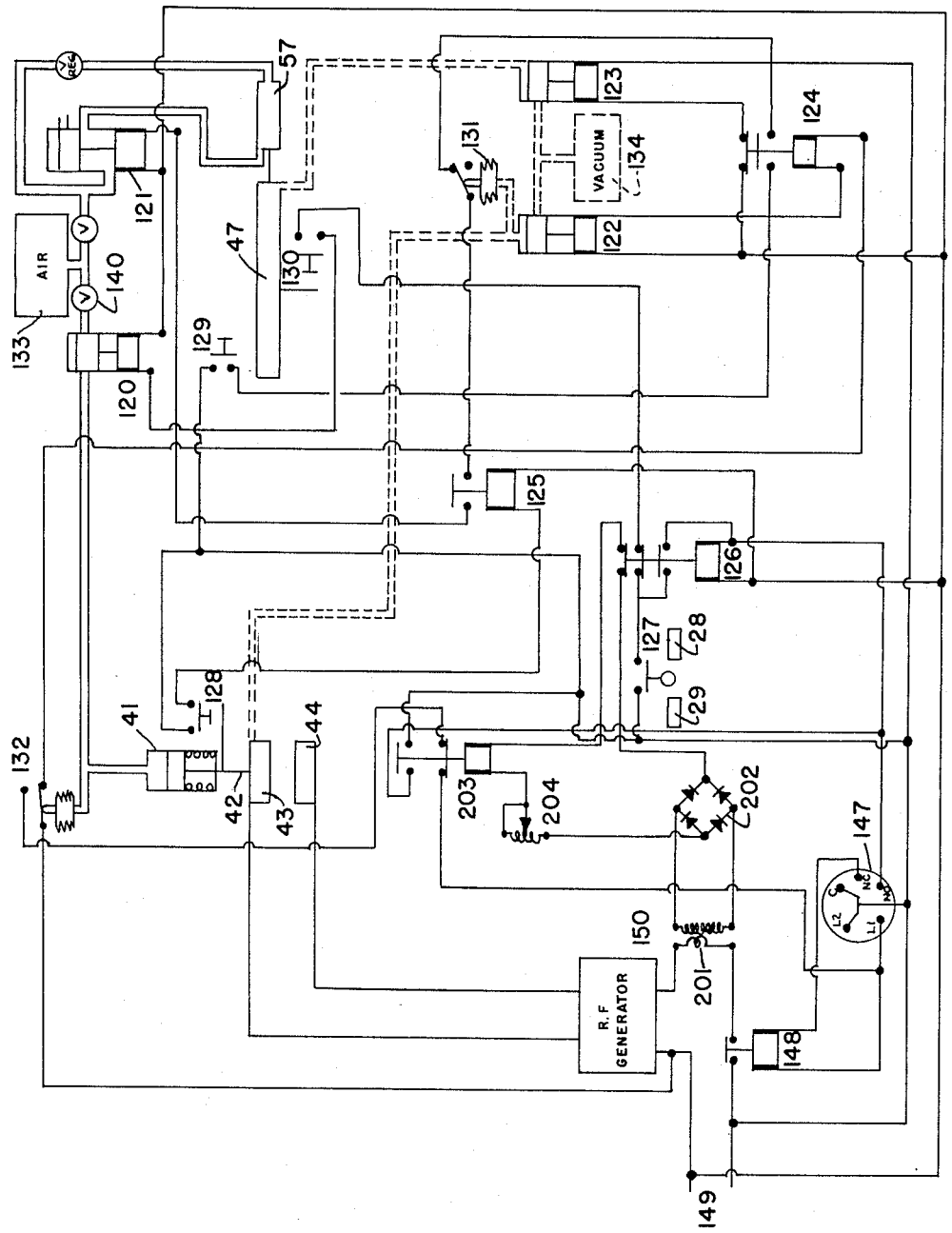

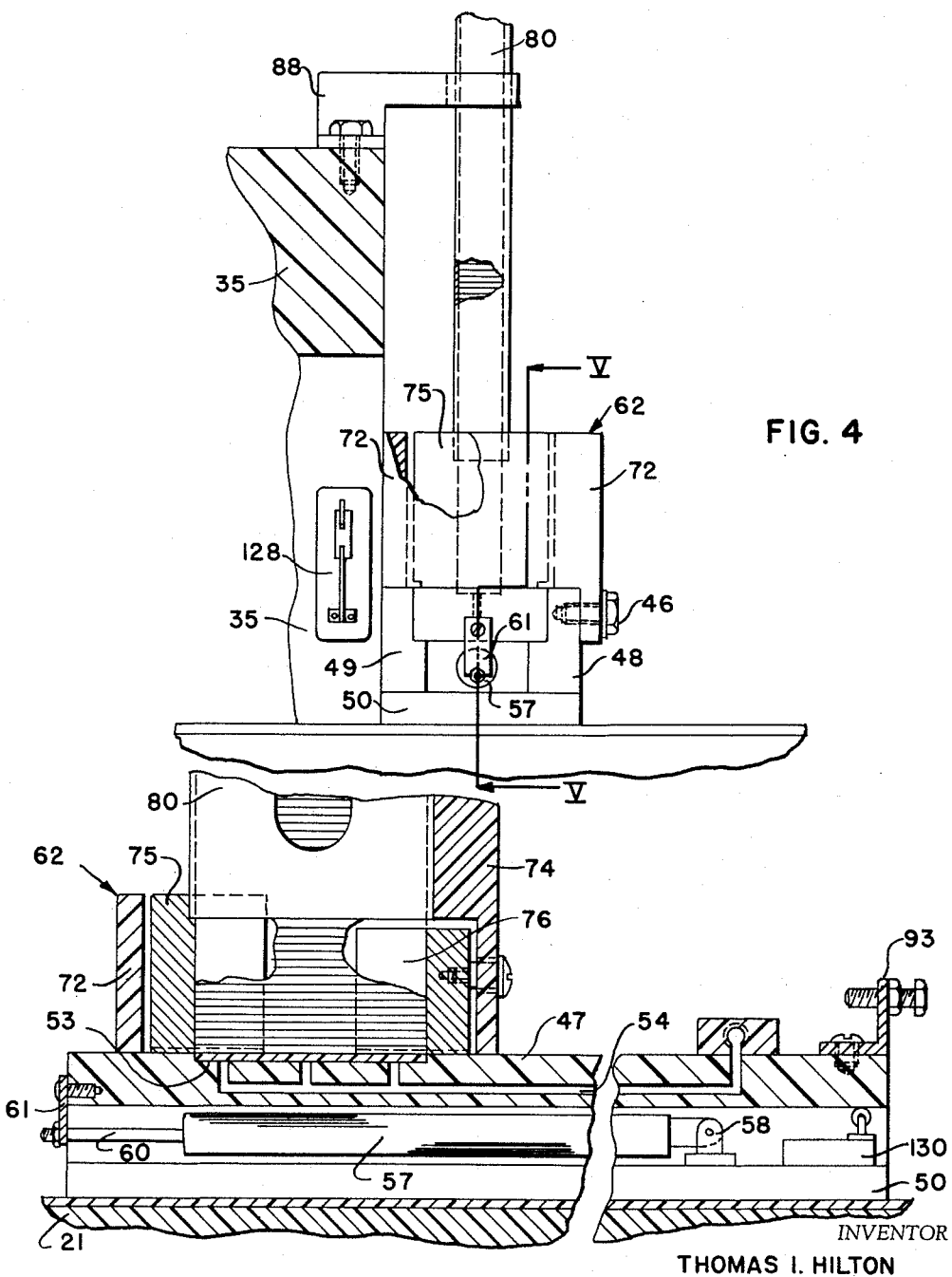

Sept. 4, 1962 T. I. HILTON 3,052,281
STAY FUSING TIMING DEVICE
Filed May 4, 1959 4 Sheets-Sheet 4

INVENTOR
THOMAS I. HILTON
BY H. Edward Foerch, Jr.
ATTORNEY

United States Patent Office 3,052,281
Patented Sept. 4, 1962

3,052,281
STAY FUSING TIMING DEVICE
Thomas I. Hilton, Troy, N.Y., assignor to Cluett, Peabody & Co., Inc., Troy, N.Y., a corporation of New York
Filed May 4, 1959, Ser. No. 810,927
1 Claim. (Cl. 156—359)

This invention relates to the time control of a high frequency source, and more particularly to an arrangement to control the fusing time of a thermoplastic material wherein the time control is selectively responsive to the degree of fusing.

It has been the practice heretofore in fusing thermoplastic to other materials, for example to fabrics, to control the fusing time of the high frequency generator by means of a mechanical timer or other similar device which is set for a constant time duration. This type of control, while suitable for many applications, has a definite limitation when uniform results are denied, but variations exist in the fusing conditions from one operation to the next.

In fusing thermoplastic materials to fabrics using high frequency heating, I have found that variations in the initial temperature of the electrodes or of the fabric-supporting parts, or variations in the thickness of the fabric material between fusing electrodes and the closeness of the weave of the fabric, can cause variations in the amount of melting and inter-wicking of the thermoplastic into the interstices of the fabric.

For example, in fusing thermoplastic strip stays to a collar fabric with a device such as described in Pfeffer S.N. 806,100, titled Automatic Stay Fusing Device, now Patent #3,006,802, I have discovered that an operator in positioning the points of a collar between the terminals of a high frequency generator will take a different length of time to position points of successive collars or even to position the two points of the same collar between the terminals. This results in the terminals cooling to varying degrees between successive fusing and, because the terminals when hot require less time to melt the thermoplastic after the generator has been energized, a different degree of fusing results for successive operations.

These variations in the fusing conditions produce undesirable variations in the mechanical attachment produced by the inter-wicked fused material. Because of variable fusing conditions, the time setting, when a constant time control is used, must be at least as great as the longest time required to obtain an effective attachment of the thermoplastic to the fabric.

I have observed that in fusing thermoplastic to fabrics the current in the primary of the high frequency generator increases appreciably as the thermoplastic melts and flows into the interstices of the fabric. The increase in the current is a function of the amount of fusing or interwicking of the thermoplastic which has taken place. When a longer time setting is used for fusing than is necessary, arcing occurs which pits the electrodes. In the past, this difficulty was solved by lowering the setting of the generator which, of necessity, increased the time required to fuse the thermoplastic to the fabric.

According to the present invention, this increase in current in the high frequency generator circuit is used as a measure of the selective amount of fusing which has taken place. A time control is provided in which the increase in current to the generator de-energizes the generator and thereby stops further fusing after a selective amount of fusing has taken place. In this manner, uniform fusing results may be obtained regardless of the variations in the initial fusing conditions. Also, by using a time setting responsive to the fusing conditions, I have been able to increase the power setting and shorten the fusing time from the previously used maximum setting for the most adverse conditions to exactly the time required for the desired amount of fusing. Thus, I have materially shortened the time required to provide a fused attachment of the thermoplastic to the fabric and I now provide uniform results for successive operations regardless of the fusing conditions.

It is therefore an object of the present invention to provide an improved time control for a high frequency generator.

A further object of the present invention is to provide an arrangement to control the fusing time for fusing thermoplastic material to a fabric wherein the time control is selectively responsive to the degree of fusing.

A further object of the present invention is to shorten the fusing time for a thermoplastic.

Still another object of the present invention is to fuse thermoplastics to fabrics with uniform results.

Other objects and advantages of the present invention will be apparent from the following description and drawing in which:

FIG. 3 is an electrical diagram with a schematic showing of the pneumatic systems;

FIG. 4 is a front view along line IV—IV of FIG. 2 showing the front support for the stay carton with a partial section showing the stay feed more clearly;

FIG. 5 is a sectional view of the slide and stay feed taken along line V—V of FIG. 4;

Figure 1:
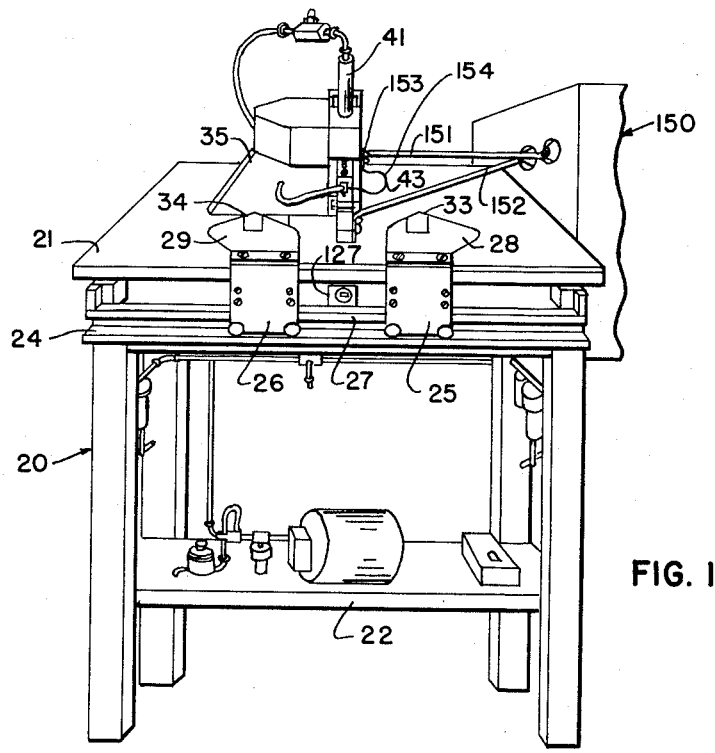
FIG. 1 is a pictorial view of the stay fusing device of the present invention.

Referring first to FIG. 1 an automatic fusing device including the time control arrangement of the present invention is shown mounted on a work bench 20. The upper surface 21 of the bench 20 is inclined and, if desired, may be made with provision for adjustment of the angle at which it is inclined to suit an operator.

The work bench 20 also includes a lower surface 22 on which is mounted pneumatic pumps and control devices to be explained more fully hereinafter. A track 24 extends across the front of the bench 20 and is located below and in front of the upper surface 21. A pair of carriages 25 and 26 are mounted on the track 24 and may easily be moved along the track 24 by an operator. The carriages 25 and 26 are connected by a bar 27 so that they are guided together in their movement along the track 24.

Attached to the carriages 25 and 26 and extending over the upper surface 21 are platens 28 and 29, respectively. The platens 28 and 29 are formed mainly of an electrical non-conductive material and are shaped to a desired configuration to receive and orient a garment part, such as a semi-finished collar of a shirt with the point portions 33 and 34, respectively, receiving the points of a semi-finished collar.

Positioned on the upper surface 21 of the work bench 20 is a mounting block 35. The mounting block 35 supports an air cylinder 41 with the piston arm 42 arranged to extend downwardly in a vertical direction.

An upper terminal 43 is attached to the lower end of the piston arm 42 and electrically insulated therefrom in a suitable manner. A lower terminal 44 is positioned directly beneath the upper terminal 43 on the upper surface 21 of the bench 20. The lower terminal is suitably insulated electrically from the upper surface 21.

As the carriages 25 and 26 are moved along the track 24 by an operator, the platens 28 and 29 are carried alternately to positions between the upper terminal 43 and the lower terminal 44. Suitable stops, no shown, limit the travel of the carriages in either direction to position a garment part on the platens 28 and 29 accurately between the terminals 43 and 44.

Figure 9:
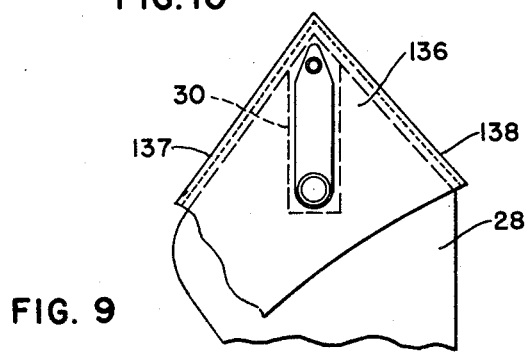
FIG. 9 is an enlarged view of a portion of one platen with a collar point and fused stay thereon.

The platens 28 and 29 are provided with electrical and heat conductive inserts 30, seen in FIG. 9, which define the area of the collar to which the stay is to be attached by fusing. When a platen is positioned between the terminals, the insert 30 in the platen functions on an extension of the lower terminal to reduce the gap between the terminals and thereby lower the power consumption of the device.

Positioned adjacent to the mounting block 35 is a guide 46 for a transfer slide 47, seen more clearly in FIG. 4. The guide 46 includes a first member 48 and a second member 49 which are separated by a base member 50. The members 48 and 49 support the slide 47 for movement along a travel between a retracted position and an extended position.

The slide 47 includes a depression 53 which is machined to accurately receive a single strip stay. The stay may be any suitably formed strip of thermoplastic, and is shown as a collar stay for a collar. A suitable duct 54 extends from the bottom surface of the depression 53 to the end of the slide 47 for connection to a vacuum source 134. The duct 54 may be formed in the slide in any well-known manner and the vacuum source 134, shown in FIG. 3, provides a sufficient vacuum on the lower surface of the depression 53 to securely hold a single strip stay in the depression.

An air cylinder 57, arranged between the first member 48 and the second member 49 of the guide 46, is provided for moving the slide 47 along the guide 46. The air cylinder 57 is secured at one end 58 to the base member 50. A piston arm 60 of the air cylinder 57 is secured to the end of the slide 47 by means of a brace 61. A suitable air pressure source 133, shown in FIG. 3, is provided to operate the piston arm 60.

A holding means 62 supports a stack of strip stays within a carton 80 above the depression 53 of the slide 47 when the slide is in its retracted position. This holding means 62 includes a forward positioning block 72 and a rear positioning block 74. Both the forward and rear positioning blocks 72, and 74 are supported on the members 48 and 49 and are secured by bolts 81 and 83. The blocks 72 and 74 may be made adjustable as by slots 82 and 84 to permit adjustment of the holding means 62. The blocks 72 and 74 bear against the side of the mounting block 35 for further support and alignment.

The forward block 72 is generally C-shaped, and is fitted with a float 75 in its center portion. The float 75 also is C-shaped with the center portion large enough to permit the stays to move downwardly from the carton 80 to the depression 53 and be guided thereby. The rear block 74 is similarly constructed with a float 76 in its center portion. With a properly adjusted spacing between the blocks 72 and 74, the carton 80 will be supported on the floats 75 and 76 and the stays will be fed from the bottom of the carton 80. The carton 80 has a cut out side portion for visual inspection of the supply of stays feeding to the slide 47.

Figure 8:
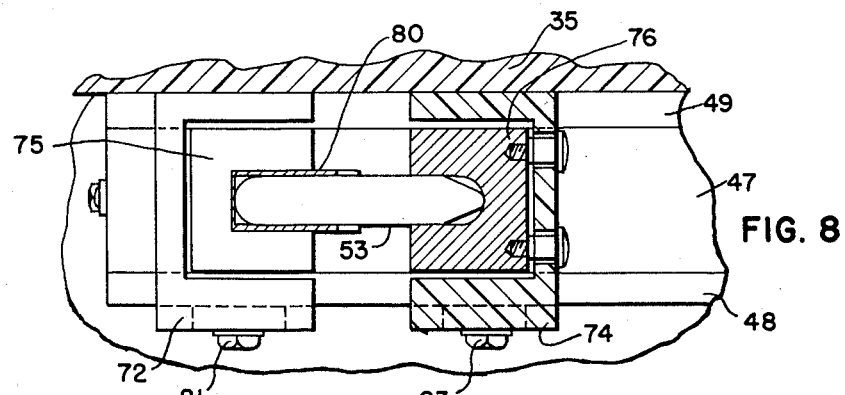
FIG. 8 is a sectional view taken along line VIII—VIII of FIG. 2.
Figure 10:
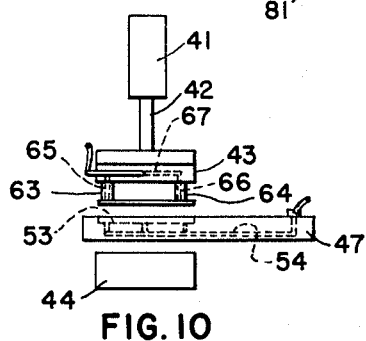
FIG. 10 is a view illustrating the transfer of a stay from the slide to the upper terminal.
Figure 11:
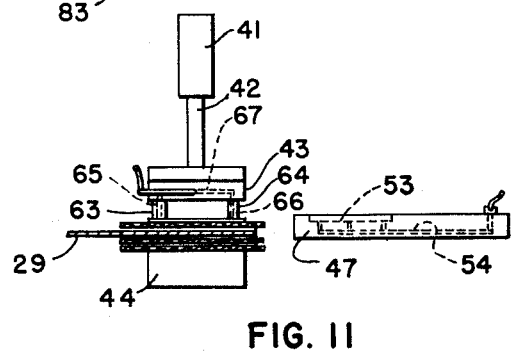
FIG. 11 is a view illustrating the upper terminal in fusing position against a collar positioned on a platen.

The purpose of the floats 75 and 76 which ride on the transfer slide 47 is to provide means for separating one stay from the next in the stack. It has been found that a small amount of play between the floats and the positioning blocks (exaggerated in FIGS. 4, 5 and 8 for clarity) effectively prevents jamming whereas an edge of a stay is more apt to override the edges of the depression 53 as the slide 47 moves forward and backward when a rigid construction is used.

The forward block 72 is shown as extending vertically only a short distance along the side of the carton 80 whereas the rear block 74 extends vertically a substantial distance along the carton 80. The shorter block 72 permits the carton 80 to be replaced easier and faster when the stack of stays has been exhausted. When this construction is used, it is desirable to provide a bracket 88 to hold the upper portion of the carton 80. The bracket 88 may be attached to the mounting block 35 in a suitable manner.

A high frequency generator 150 is mounted adjacent to the work bench 20 and provides a source of current at approximately 100 megacycles. Leads 151 and 152 extend from the generator to the connector 153 on the mounting block 35 and to the lower terminal 44 respectively. A flexible connector 154 extends from the connector 153 to the upper terminal 43. The flexible connector 154 permits movement of the upper terminal 43 through the travel of the piston arm 42.

Figure 6:
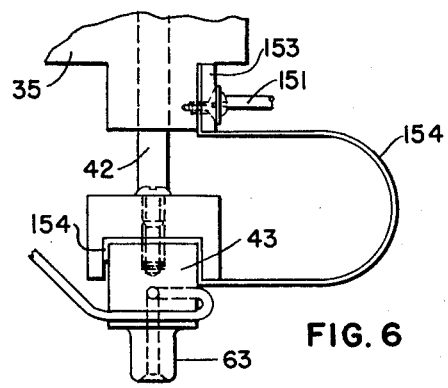
FIG. 6 is a front view of the upper terminal.
Figure 7:
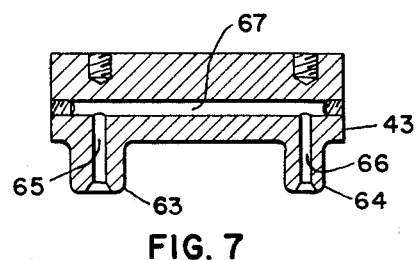
FIG. 7 is a sectional view of the upper terminal.

The upper terminal 43 is formed with fusing tips 63 and 64 of a desired configuration. As shown in FIGS. 6 and 7 the fusing tips 63 and 64 may be cylindrical members depending from the body of the terminal. Extending through the fusing tips 63 and 64 are ducts 65 and 66, respectively, which connect to a duct 67. The duct 67 is connected to a source of vacuum 134 in a well-known manner and for the purpose which will be explained with the operation of the device.

At an intermediate step in the formation of a collar, the collar includes two face plies and a liner ply sewn together in an inverted position by a line of stitching extending along the outer edge of the collar, but not along the edge which is to later attach the collar to the neckband. The operator of the present stay fusing device manually positions one tip of the partially formed collar in its inverted position on to one of the platens, for example platen 28, as seen in FIG. 9. The ply to which the stay is to be fused, for example the back face of the collar, is positioned on the top of the platen 28 and the other face ply and liner ply are positioned at the bottom side of the platen. The platen 28 is shaped to engage the edges 137 and 138 of the collar and thereby position the collar with respect to the terminals 43 and 44.

The operation of the device will now be explained with reference to FIG. 3. Since in the normal rest position of the device a stay is positioned on the fusing tips 63 and 64 of the upper terminal 43, the sequence of operation of the stay fusing device will be described starting at that point in the cycle.

As the operator moves the carriages 25 and 26 along the track 24, the platen 28 moves until it hits a stop. At this point, the platen 28 accurately positions the collar point between the upper terminal 43 and the lower terminal 44. In this position, the platen 28 also engages a limit switch 127. As the stay slide 47 is in a retracted position with the depressions 53 beneath the stack, the limit switch 130 located beneath the slide 47, see FIG. 5, is in a closed position. Therefore, the closing of the limit switch 127 completes a circuit from a source of electrical current 149, and including a normally closed contact on the relay 126, to energize and operate the air solenoid valve 120. The solenoid valve 120 admits high pressure air from the source 133 through a pressure regulating valve 140, to the upper portion of the air cylinder 41. This high pressure air lowers the piston arm 42 and the upper terminal 43. The collar stay positioned on the terminal 43 thus is lowered on to the fabric of the positioned collar. The high pressure air from the source 133, upon building up, additionally operates the pressure relay 132 to energize a relay 148 through the timer 147 to complete a circuit from the source 149 to the high frequency generator 150, and thereby energize the terminals 43 and 44 for fusing the stay to the fabric.

The pressure relay 132, in operating, breaks a circuit including relay 124 and solenoid valve 122. The release of the solenoid valve 122 shuts the vacuum off from the source 134 to the upper terminal 43 to release the stay. This permits the vacuum relay 131 to assume its normally closed position. The relay 124, upon opening, completes a circuit from the source 149 to energize the solenoid valve 123 providing a vacuum from the source 134 to the ports in the depression 53 of the slide 47.

According to the present invention, a time control means is provided in the control circuit to de-energize the high frequency generator 150 after lapse of a time period which is selectively responsive to the degree of fusing. This time control means includes a transformer 201 connected in series with the primary of the plate transformer of the high frequency generator 150. The current in the primary of the generator 150 induces a fairly high voltage in the secondary circuit of the transformer 201 and the current in the secondary circuit is passed through a full wave bridge rectifier 202 to a controlling relay 203. The circuit to the controlling relay 203 includes a potentiometer 204 which is used to adjust the level at which the relay 203 pulls in. The circuit for the relay 203 also includes a normally closed contact on the relay 126.

A normally closed contact on the relay 203 is placed in the circuit of the relay 148 in the primary circuit for the generator 150. When the relay 203 is operated to open the normally closed contacts, the circuit to the relay 148 is broken thereby disconnecting the high frequency generator from the source and stopping further fusing. A normally open contact on the relay 203 is connected in parallel with the ordinary timer circuit for the relay 126 so that operation of the relay 203 will lock in the relay 126 and prevent further recycling of the fusing device until the holding circuit for the relay 126 is broken by the removal of the fused part from the terminals 43 and 44, as indicated by the opening of the limit switch 127.

Should the selective time control fail to de-energize the high frequency generator upon expiration of the predetermined time, the mechanical timer 147 is set to break the circuit to the relay 148 which in turn disconnects the radio frequency generator 150 to terminate the fusing of the thermoplastic stay to the fabric. The mechanical timer 147 would further complete a circuit to energize relay 126 and lock in this relay preventing recycling of the machine until the platen 28 has been moved from between the terminals as indicated by the opening of the limit switch 127. The relay 126 upon operating also breaks the circuit to the solenoid valve 120 which then closes and cuts air off from the source 133 to the cylinder 41 and to the air pressure relay 132. This action raises the upper terminal 43 and reverses the pressure relay 132.

The reversal of the relay 132, however, does not actuate relays 124 and 122 immediately because the circuit from these relays to the source 149 is not complete at this time, both sides of the relays being connected to a common wire. The upper terminal 43 upon rising actuates a limit switch 128 which completes a circuit from the source 149 to energize a relay 125. The relay 125, in turn, completes a circuit from a source 149 to the air solenoid valve 121 actuating the valve.

Upon lapse of the pre-determined period of time, the timer 147 breaks the circuit to the relay 148 which in turn disconnects the radio frequency generator 150 to terminate the fusing of the thermoplastic stay to the fabric. The timer 147 further completes a circuit to energize the relay 126 which locks in preventing recycling of the machine until the platen 28 has been moved from between the terminals as indicated by the opening of the limit switch 127. The relay 126, upon operating, breaks the circuit to the solenoid valve 120 which then closes and cuts air off from the source 133 to the cylinder 41 and to the air pressure relay 132. This action raises the upper terminal 43 and reverses the pressure relay 132. The reversal of the relay 132, however, does not actuate relays 124 and 122 immediately because the circuit to the source 149 is not completed at this time, both sides of the relays 124 and 122 being connected to a common wire.

Figure 2:
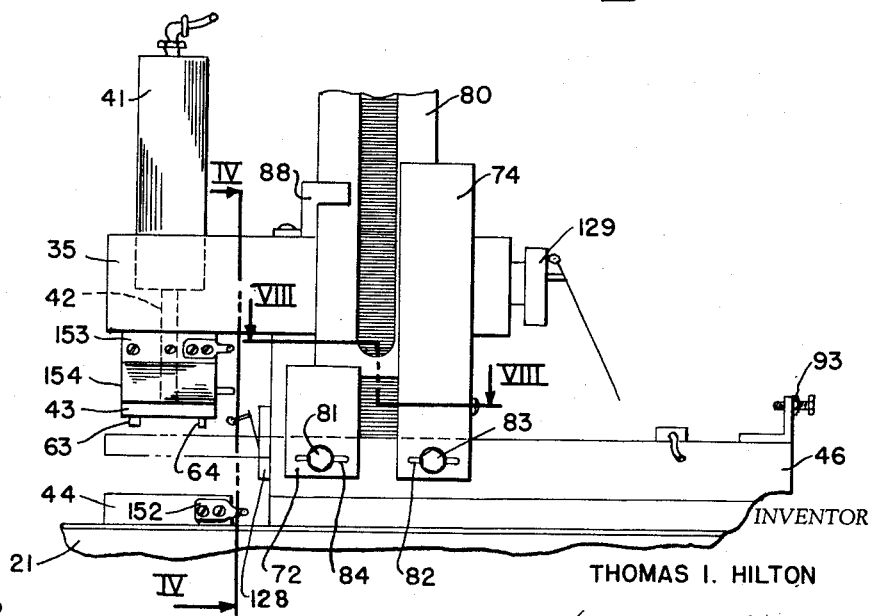
FIG. 2 is a side view of the device shown in FIG. 1.

The upper terminal 43 upon rising actuates a limit switch 128 which completes a circuit from the source 149 to energize a relay 125. The relay 125, in turn, completes a circuit from a source 149 to the air solenoid valve 121 actuating the valve 121 shutting off the flow of high pressure air from the source 133 to the return side of the cylinder 57 and venting the return side to atmosphere. A supply of air at a reduced pressure is supplied from the source 133 to the forward side of the cylinder 57 which causes the piston arm 60 and the slide 47 to move forward. The piston arm 60 carries the slide 47 in its advance to a position such that the stay held in the depression 53 by the vacuum is accurately positioned beneath the upper terminal 43. The slide 57, upon reaching the end of its forward motion, operates a limit switch 129 which completes a circuit from the source 149 to the relays 122 and 124, thereby energizing them and switching the vacuum from the slide 57 to the upper terminal 43. The limit switch 129 is shown in FIG. 2 mounted on the rear of the mounting block 35. A bracket 93 on the slide 47 operates the limit switch as the slide 47 reaches its forward travel.

With the transfer to the vacuum from the slide 47 to the upper terminal 43, the stay is transferred from the depression 53 to the fusing tips 63 and 64. This transfer is signaled by the vacuum relay 131 which, upon operating, breaks the circuit for the solenoid valve 121. The solenoid valve 121 upon closing permits high pressure air to flow again to the return side of the piston 57. The high pressure on the return side of the cylinder 57 counters the lower pressure on the other side and causes the slide attached to the piston arm 60 to be returned to its retracted position. Unless the vacuum switch 131 signals the transfer of a stay to the upper terminal, the stay slide will not return and will thereby stop the automatic operation until the trouble has been cleared.

As the slide 47 reaches the end of its return travel, it operates the limit switch 130 to return the circuit to its initial condition ready for recycling by the closure of the limit switch 127 as either of the platens 28 or 29 is moved into position between the terminals 43 and 44.

The movement of the carriage opens switch 127 and breaks the holding circuit to reset the relay 126. The timer 147 is reset by the release of the pressure relay 132.

It will be seen that a time control responsive to the amount of fusing is provided for the fusing device. This control is in parallel with the mechanical timer 147 which may be set in the normal manner for a time period for example of 1¼ to 2 seconds. However, the actual fusing time required may be of the order of ¾ of a second. In this case, the relay 203 will de-energize the high frequency generator 150 after the desired degree of fusing has been effected as has been explained.

Because an exact time control of the fusing is provided which will de-energize the generator 150 after a selected amount of fusing has been effected, the power of the generator may be increased to further decrease the fusing time. Even with the increased power settings, the generator 150 is de-energized by the present time control before the voltage rises to an arcing level. This time control thus provides a longer life for the terminals 43 and 44.

It will be apparent that the present time control may be used in other control circuits to selectively deenergize the generator 150 and control the amount of fusing of a thermoplastic material. Although I have illustrated only one embodiment of my invention, it will be abovious to those skilled in the art that the automatic fusing device herein described and shown may be used for attaching thermoplastic strip stays to other types of garments, and that the time control arrangement may be used in other ways within the electrical circuit to obtain the results hereinbefore described.

I claim:

In a device for fusing a thermoplastic stay to a fabric, a high-frequency electrical generator having a first and second electrode with face portions in face to face relation, means for positioning a fabric and a thermoplastic stay between said electrodes, motor means connected to said first electrode for moving this electrode toward said second electrode to bring the face portion thereof in intimate contact with said thermoplastic stay and said stay in intimate contact wtih said fabric and establishing a predetermined clearance distance between the electrodes, a first circuit including the primary coil of a transformer and a normally closed pair of contacts of a circuit breaking relay connecting said generator to a current source to cause dielectric heating of said stay material whereby said stay material flows into the interstices of said fabric resulting in a decrease in said predetermined clearance distance and an increase in current in said circuit, the coil of said circuit breaking relay being connected to a current source by a circuit including a normally closed pair of contacts of a second relay, and a second current sensing circuit having connected in series therein the coil of said second relay, a variable resistor to adjust the current level at which said second relay is adapted to open, and the secondary coil of said transformer to induce a current flow through said second sensing circuit which is proportional to the current flow through said first circuit and through the opening of said second relay which in turn opens the circuit breaking relay to disconnect the generator from said current source when the current flow reaches a predetermined value, whereby the fusing time of said generator is controlled selectively responsive to the degree of fusing of the thermoplastic stay.

References Cited in the file of this patent

UNITED STATES PATENTS

| | | |
|---|---|---|
| 2,077,653 | Westin | Apr. 20, 1937 |
| 2,454,618 | Stone | Nov. 23, 1948 |
| 2,650,288 | Bradley | Aug. 25, 1953 |
| 2,747,646 | Lippman | May 29, 1956 |
| 2,763,758 | Kohler | Sept. 18, 1956 |
| 2,786,926 | Rothstein et al. | Mar. 26, 1957 |
| 2,850,609 | Siegel | Sept. 2, 1958 |